United States Patent
Kaltenbach et al.

(10) Patent No.: US 11,999,237 B2
(45) Date of Patent: Jun. 4, 2024

(54) MOTOR VEHICLE TRANSMISSION FOR AN AT LEAST PARTIALLY ELECTRICALLY DRIVEN MOTOR VEHICLE

(71) Applicant: ZF Friedrichshafen AG, Friedrichshafen (DE)

(72) Inventors: Johannes Kaltenbach, Friedrichshafen (DE); Thomas Martin, Weissensberg (DE); Mladjan Radic, Lonsee (DE); Kai Bornträger, Langenargen (DE); Johannes Glückler, Friedrichshafen (DE); Stefan Renner, Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/240,535

(22) Filed: Aug. 31, 2023

(65) Prior Publication Data
US 2024/0066971 A1    Feb. 29, 2024

(30) Foreign Application Priority Data
Aug. 31, 2022   (DE) ..................... 10 2022 209 060.8

(51) Int. Cl.
*B60K 6/365* (2007.10)
*B60K 6/547* (2007.10)

(52) U.S. Cl.
CPC ............. *B60K 6/365* (2013.01); *B60K 6/547* (2013.01)

(58) Field of Classification Search
CPC ........... B60K 6/365; B60K 6/547; B60K 1/02
See application file for complete search history.

(56) References Cited

U.S. PATENT DOCUMENTS

| | | |
|---|---|---|
| 5,168,946 A | 12/1992 | Dorgan |
| 5,447,478 A | 9/1995 | Braun |
| 6,139,464 A | 10/2000 | Roske |
| 7,422,535 B2 | 9/2008 | Raghavan et al. |
| 8,640,801 B2 | 2/2014 | Hennings et al. |
| 8,870,707 B2 | 10/2014 | Mauer et al. |
| 9,242,555 B2 | 1/2016 | Wenthen |
| 9,334,930 B2 | 5/2016 | Kaltenbach |
| 9,447,848 B2 | 9/2016 | Beck et al. |
| 11,124,064 B2 | 9/2021 | Kaltenbach et al. |

(Continued)

FOREIGN PATENT DOCUMENTS

| | | |
|---|---|---|
| AT | 233406 | 5/1964 |
| DE | 1 177 671 | 9/1964 |

(Continued)

OTHER PUBLICATIONS

German Patent Office, Search Report issued in German application No. 10 2022 209 058.6 (dated May 16, 2023).

*Primary Examiner* — Jacob S. Scott
*Assistant Examiner* — Farhana Pervin
(74) *Attorney, Agent, or Firm* — 503421

(57) ABSTRACT

A motor vehicle transmission (1) has a drive input shaft (15), a drive output shaft (16), a first planetary gearset (P1), and a second planetary gearset (P2). The drive input shaft (15) is provided for coupling to a drive machine. In addition, a first shifting element (A) and a second shifting element (B) are provided, at least functionally. Also disclosed is a drive unit (5), a motor vehicle drivetrain, a hybrid or electric vehicle, and a method for operating a motor vehicle transmission.

23 Claims, 10 Drawing Sheets

(56) References Cited

U.S. PATENT DOCUMENTS

| | | |
|---|---|---|
| 2005/0148421 A1 | 7/2005 | Keuth |
| 2010/0190602 A1 | 7/2010 | Wittkopp et al. |
| 2012/0258831 A1 | 10/2012 | Knoblauch et al. |
| 2015/0167789 A1* | 6/2015 | Beck .................... F16H 3/66 475/269 |
| 2017/0036527 A1* | 2/2017 | Hwang ................. B60K 6/442 |
| 2017/0175863 A1 | 6/2017 | Kramer et al. |
| 2017/0204942 A1 | 7/2017 | Luchi et al. |
| 2018/0319264 A1* | 11/2018 | Kaltenbach ............. F16H 3/724 |
| 2019/0344660 A1* | 11/2019 | Kumar ................... B60K 17/04 |
| 2020/0282827 A1* | 9/2020 | Kaltenbach ............ B60K 17/06 |
| 2021/0123512 A1* | 4/2021 | Glückler ................ F16H 3/66 |
| 2022/0402358 A1* | 12/2022 | Tabata ..................... B60K 6/52 |

FOREIGN PATENT DOCUMENTS

| | | |
|---|---|---|
| DE | 103 33 433 A1 | 2/2005 |
| DE | 1 2008 031 456 A1 | 1/2010 |
| DE | 10 2008 063 533 A1 | 7/2010 |
| DE | 10 2009 002 437 A1 | 10/2010 |
| DE | 10 2012 216 228 A1 | 3/2014 |
| DE | 10 2013 226 471 A1 | 6/2015 |
| DE | 10 2017 111 051 B3 | 6/2018 |
| DE | 10 2018 000 187 A1 | 8/2019 |
| DE | 10 2019 202 208 A1 | 8/2020 |
| DE | 10 2019 131 763 A1 | 5/2021 |
| DE | 10 2019 131 764 A1 | 5/2021 |
| EP | 0 618 382 A1 | 10/1994 |
| GB | 1 217 364 | 12/1970 |
| JP | 2013-160248 A | 8/2013 |
| WO | 2013/177785 A1 | 12/2013 |
| WO | 2019/115204 A1 | 6/2019 |

* cited by examiner

|   | A | B | C |    |    |
|---|---|---|---|----|----|
| I | X |   |   | G1 | 12 |
| II|   | X |   | G2 | 12 |
| III|  |   | X | G3 | 12 |

Fig. 4

| | A | B | C | D | E | | |
|---|---|---|---|---|---|---|---|
| I' | X | | | | | G1 | 12 |
| II' | X | X | | | X | G1 | 12 + 25 |
| III' | | X | | | | G2 | 12 |
| IV' | | X | X | | X | G2 | 12 + 25 |
| V' | | | X | | | G3 | 12 |
| VI' | | | X | | X | G3 | 12 + 25 |

Fig. 8

|    | A | B | D | E |    |         |
|----|---|---|---|---|----|---------|
| I"  | X |   |   |   |    |         |
| II" | X |   |   | X | G1 | 12      |
| III"|   | X |   |   | G1 | 12 + 25 |
| IV" |   | X |   | X | G2 | 12      |
| V"  |   |   | X | X | G2 | 12 + 25 |
|     |   |   |   |   | G3 | 12 + 25 |

Fig. 10

MOTOR VEHICLE TRANSMISSION FOR AN AT LEAST PARTIALLY ELECTRICALLY DRIVEN MOTOR VEHICLE

RELATED APPLICATIONS

This application claims the benefit of and right of priority under 35 U.S.C. § 119 to German Patent Application no. 10 2022 209 060.8, filed on 31 Aug. 2022, the contents of which are incorporated herein by reference in its entirety.

FIELD OF THE DISCLOSURE

The invention relates to a motor vehicle transmission for an at least partially electrically driven motor vehicle, comprising a drive input shaft, a drive output shaft, and a first planetary gearset and a second planetary gearset, wherein the drive input shaft is provided for coupling to a drive machine, in particular an electric machine, wherein the first planetary gearset and the second planetary gearset each comprise a first element, a second element, and a third element in the form of a sun gear, a planetary web, and a ring gear in each case, wherein a first shifting element and a second shifting element are provided at least functionally, wherein the drive output shaft is connected rotationally fixed to the second element of the first planetary gearset, wherein the third element of the first planetary gearset and the second element of the second planetary gearset are in rotationally fixed connection with one another, and wherein the third element of the second planetary gearset is immobilized. Furthermore, the invention relates to a drive unit for an at least partially electrically driven motor vehicle, a motor vehicle drivetrain for a hybrid or electric vehicle, a hybrid or electric vehicle and a method for operating a motor vehicle drivetrain.

BACKGROUND

In motor vehicles made as electric or hybrid vehicles, as part of a respective drivetrain a motor vehicle transmission is provided between at least one electric machine and drive wheels of the motor vehicle concerned, in order to be able to transmit a drive movement from the at least one electric machine to the drive wheels, particularly in the slow range. Besides single-gear transmissions, for that purpose sometimes motor vehicle transmissions are used in which two or more gears can be engaged.

From DE 10 2019 202 994 A1 a drive axle of an electric vehicle is known, such that in the said drive axle a drive unit with a vehicle transmission and an electric machine are provided. A rotor of the electric machine is connected rotationally fixed to a drive input shaft of the motor vehicle transmission, which besides the drive input shaft also comprises a drive output shaft, two planetary gearset and three shifting elements. The planetary gearsets each consist of several elements which, in each individual planetary gearset, are in the form of a sun gear, a planetary web and a ring gear. In this case the second element of the first planetary gearset is connected rotationally fixed to the drive output shaft, while the third element of the first planetary gearset and the second element of the second planetary gearset are in rotationally fixed connection with one another. Furthermore, the third element of the second planetary gearset is immobilized.

SUMMARY

Starting from the above-described prior art, the purpose of the present invention is to provide a motor vehicle transmission for an at least partially electrically driven motor vehicle, such that in the said motor vehicle transmission a drive machine can be suitably incorporated and in which high efficiency should be attainable in at least one gear.

This objective is achieved with a motor vehicle transmission as variously disclosed herein. Also disclosed is a drive unit in which a motor vehicle transmission according to the invention is provided. In addition, the present disclosure relates to a motor vehicle drivetrain for a hybrid or electric vehicle. Finally, the present disclosure further relates to a method for operating a motor vehicle transmission according to the invention.

According to the invention, a motor vehicle transmission comprises a drive input shaft, a drive output shaft and a first planetary gearset and a second planetary gearset. The drive input shaft is provided for coupling to a drive machine, this being in particular an electric machine. The first planetary gearset and the second planetary gearset each comprise a first element, a second element and a third element, respectively in the form of a sun gear, a planetary web and a ring gear, and a first shifting element and a second shifting element are also provided, at least functionally. Moreover, the drive output shaft is connected rotationally fixed to the second element of the first planetary gearset, whereas the third element of the first planetary gearset and the second element of the second planetary gearset are in rotationally fixed connection with one another. Furthermore, the third element of the second planetary gearset is immobilized.

A "shaft," such as the drive input shaft or the drive output shaft of the motor vehicle transmission according to the invention, is understood in the context of the invention to mean a rotatable component of the motor vehicle transmission by way of which a power flow can be created between components, if need be, by means of the simultaneous actuation of an at least functionally provided shifting element. The shaft concerned can in that case connect the said components to one another axially, or radially, or even both axially and radially. Thus, the shaft concerned can constitute an intermediate component via which a particular component is for example connected purely radially. Furthermore, depending on the shape and connections to the components or its ability to be connected thereto, the shaft concerned can be a solid shaft, a hollow shaft, or a partly solid and partly hollow shaft. Alternatively, or in addition, the shaft concerned can be made as one piece or of more than one piece.

In the context of the invention "axial" means an orientation in the direction of a longitudinal central axis of the motor vehicle transmission, parallel to which rotation axes of shafts of the motor vehicle transmission and the elements of the planetary gearsets are orientated. Then, "radial" means an orientation in the diametral direction of a component of the transmission, in particular a particular shaft or a particular element of the planetary gearsets.

The motor vehicle transmission according to the invention has a drive input shaft which, in the motor vehicle transmission according to the invention, is provided in order to form a coupling to a drive machine on the drive input side. Particularly preferably, this drive input shaft serves for the connection of just one drive machine. For that purpose, the drive input shaft is designed with a connection point at which a coupling of the drive input shaft to the drive machine can be formed. In the installed condition of the motor vehicle transmission, the connection of the drive machine to the connection point of the drive input shaft is in particular permanent, preferably when the drive machine is in the form of an electric machine. Alternatively, however, an intermediate starting element such as a hydrodynamic torque converter, a starting clutch, etc., can be provided, by means of which the drive input shaft is or can be coupled at its connection point to the upstream drive machine. In particular, this is done when the drive machine is in the form of an internal combustion engine.

When the coupling has been formed and when the motor vehicle transmission is in its installed condition, there is in particular always a fixed rotation speed ratio between the rotation speed of the drive input shaft of the motor vehicle transmission and the rotation speed of the drive machine. Thus, in the context of the invention, at least one further gear ratio step can be provided between the drive input shaft and the drive machine, for example a spur gear stage and/or a planetary stage, by way of which a pre-geared rotation movement of the drive machine can be obtained at the drive input shaft. Particularly preferably, however, when the coupling has been formed, the drive input shaft of the motor vehicle transmission according to the invention is in rotationally fixed connection with the drive machine, so that during operation the drive machine and the drive input shaft rotate at the same speed.

The motor vehicle transmission is, in particular, a transmission for a hybrid or an electric motor vehicle, which is provided to be connected by way of its drive input shaft to a drive machine in the form of an electric machine. As described earlier, a rotor of the electric machine can be coupled via at least one intermediate gear ratio step to the drive input shaft of the motor vehicle transmission. Particularly preferably however, when the motor vehicle transmission according to the invention has been installed, a rotor of the electric machine is connected rotationally fixed to the drive input shaft so that the said rotor of the electric machine is connected rotationally fixed to the rotor of the electric machine.

In the motor vehicle transmission according to the invention, the drive output shaft is provided in particular in order to form a coupling of the motor vehicle transmission on the drive output side to components which, in the installed condition of the motor vehicle transmission, follow in the power flow direction to drive wheels of the motor vehicle concerned. In this way, the drive output shaft of the motor vehicle transmission according to the invention can in particular be coupled to a differential gearset positioned coaxially or with its axis offset relative to the drive input shaft and the drive output shaft. Depending on the specific incorporation of the motor vehicle transmission in a drivetrain of the motor vehicle, the differential gearset can be in the form of a longitudinal or a transverse differential. The coupling of the drive output shaft to a downstream differential gearset can be realized directly or indirectly by way of one or more intermediate gear ratio steps, such as spur gear or planetary steps.

In the motor vehicle transmission according to the invention, the drive input shaft and the drive output shaft are in particular arranged coaxially with one another, and it is also preferable for the planetary gearsets to be positioned coaxially with the drive input shaft and the drive output shaft. In that way a structure of the motor vehicle transmission which is more compact in the radial direction can be produced.

The planetary gearsets consist in each case of a first element, a second element, and a third element, wherein the elements of the individual planetary gearset are formed respectively by a sun gear, a planetary web, and a ring gear. Particularly preferably, the individual planetary gearset is a minus planetary gearset in which on the planetary web at least one planetary gearwheel is mounted to rotate, this at least one planetary gearwheel meshing both with the respective sun gear and with the respective ring gear. When the respective planetary gearsets are in the form of minus planetary gearsets, then the first element of the planetary gearset concerned is the sun gear, the second element of the said planetary gearset is the planetary web, and the third element of the said planetary gearset is the ring gear.

Alternatively, in principle one or both planetary gearsets could be plus planetary gearsets. In that case, at least one planetary gearwheel pair is mounted to rotate, of whose planetary gearwheels one meshes with the sun gear and one with the ring gear concerned in each case. In addition, the planetary gearwheels of the at least one planetary gearwheel pair mesh with one another. Other than in the minus-planetary-gearset design, in this case the first element of the planetary gearset concerned is preferably the sun gear, the second element thereof is the ring gear, and the third element thereof is the planetary web. As already described earlier, however, in the context of the present invention both planetary gearsets are preferably minus planetary gearsets. Particularly preferably, in the motor vehicle transmission according to the invention just two planetary gearsets are provided.

The motor vehicle transmission according to the invention comprises, at least functionally, a first shifting element and a second shifting element by the selective actuation of which, in particular, various gears between the drive input shaft and the drive output shaft can be engaged. In this case, in the motor vehicle transmission according to the invention, preferably at least two shifting elements are functionally provided, whereas particularly preferably, in functional terms, the motor vehicle according to the invention has three or more shifting elements.

In the context of the invention, to say that a particular shifting element is provided "at least functionally" means that in the motor vehicle according to the invention at least the respective function of the shifting element concerned is reproduced. Thus, the shifting elements can specifically be physically present actually as individual shifting elements, or their function can be reproduced by some other component such as a shifting device. In that case the function-reproducing component can combine the functions of two or more shifting elements in a single device.

The invention is now based on the technical principle that the drive input shaft is connected rotationally fixed to the first element of the first planetary gearset. The at least functionally provided first shifting element is designed, in its closed condition, to bring about a fixed state between the third element of the first planetary gearset and the second element of the second planetary gearset, whereas the at least functionally provided second shifting element is designed, in its closed condition, to connect the first element of the second planetary gearset rotationally fixed to the drive output shaft.

Correspondingly therefore, in the motor vehicle transmission according to the invention the first element of the first planetary gearset and the drive input shaft are permanently connected rotationally fixed to one another so that the first element of the first planetary gearset and the drive input shaft always rotate together. Moreover, the third element of the first planetary gearset and the second element of the second planetary gearset are always connected rotationally fixed to one another, which means that the third element of the first planetary gearset and the second element of the second planetary gearset always rotate together. The third element of the second planetary gearset is permanently fixed, so that the third element of the second planetary gearset is always prevented from rotating. Furthermore, the second element of the first planetary gearset and the drive output shaft are permanently connected rotationally fixed to one another, so that the drive output shaft and the second element of the first planetary gearset always rotate together.

The permanent rotationally fixed connection between the third element of the first planetary gearset and the second element of the second planetary gearset is preferably formed by an intermediate shaft, such that the shaft can be made in one piece with the third element of the first planetary gearset and/or the second element of the second planetary gearset. The latter is realized in particular when the elements permanently connected to one another are arranged spatially closely adjacent. In the context of the invention, the respective rotationally fixed connection of the drive input shaft and the drive output shaft to the element of the particular planetary gearset with which they are respectively associated can be realized in the form of a rotationally fixed connection of individual components, i.e., the shaft concerned and the element of the respective planetary gearset concerned are separate components which are in rotationally fixed connection with one another. Alternatively, however, an integral design of the shaft concerned, i.e., the drive input shaft or the drive output shaft, and the element of the respective planetary gearset connected rotationally fixed thereto, can also be considered.

Closing of the at least functionally provided first shifting element fixes the third element of the first planetary gearset and the second element of the second planetary gearset, whereby as a result the third element of the first planetary gearset and the second element of the second planetary gearset are prevented from rotating. In contrast, if the at least functionally provided second shifting element is changed to a closed state, then a rotationally fixed connection of the first element of the second planetary gearset and the drive output shaft is produced, so that consequently the first element of the second planetary gearset and the drive output shaft rotate together.

The permanently immobilized condition of the third element of the second planetary gearset and the fixing of the third element of the first planetary gearset and the second element of the second planetary gearset by means of the at least functionally provided first shifting element takes place, respectively, in particular because a rotationally fixed connection to a permanently fixed structural element exists or is formed. Here, the permanently fixed structural element is preferably a transmission housing of the motor vehicle transmission, part of that transmission housing, or a component connected rotationally fixed thereto. The third element of the second planetary gearset can in this case be made in one piece with the said permanently fixed structural element.

In the case of components of the motor vehicle transmission according to the invention which are only connected rotationally fixed with one another by actuating a respective, at least functionally provided shifting element, a connection is preferably formed by way of one or more intermediate shafts. Thus, in the context of the invention respective designs can also be considered in which the shaft concerned is made integrally with one of the two components that are to be connected in a rotationally fixed manner.

The design of a motor vehicle transmission according to the invention has the advantage that thereby a motor vehicle transmission with a compact structure can be produced, by means of which a suitable incorporation of a drive machine, in this case an electric machine in particular, is possible. This can be done with a small number of at least functionally provided shifting elements. In particular, in the motor vehicle transmission according to the invention, several different gears can be engaged, which can be used by the connected drive machine, such that at least one gear can be engaged in which a power flow only passes through one of the planetary gearsets. With this at least one gear, therefore, a high efficiency can be achieved.

Thus, in the motor vehicle transmission according to the invention, a first gear between the drive input shaft and the drive output shaft can be engaged by closing the at least functionally provided first shifting element. In that way the third element of the first planetary gearset is immobilized, whereby the drive input shaft is coupled to the drive output shaft only by way of the first planetary gearset, while the second planetary gearset is free from load. Correspondingly, in this first gear good efficiency is achieved. Moreover, a second gear between the drive input shaft and the drive output shaft can be engaged by closing the second shifting element. This couples the drive input shaft to the drive output shaft by way of both planetary gearsets. Particularly preferably, in the motor vehicle transmission according to the invention the drive input shaft can be decoupled from the drive output shaft in particular when neither of the at least functionally provided shifting elements is closed. In that way the drive machine connected to the drive input shaft is also decoupled from the drive output shaft so that free rolling of the motor vehicle can take place without losses due to the otherwise co-rotating drive machine.

In an embodiment of the invention, a third shifting element is also provided at least functionally, which is designed, when closed, to bring the first element of the second planetary gearset and the drive input shaft into rotationally fixed connection with one another. In this case a third shifting element is functionally provided in addition to the first and second shifting elements, such that when this third shifting element is closed the first element of the second planetary gearset and the drive input shaft are connected rotationally fixed to one another and therefore rotate together.

In a motor vehicle transmission designed in accordance with the above embodiment, a third shifting element can be engaged between the drive input shaft and the drive output shaft by closing the said third shifting element. In that way the first element of the second planetary gearset can be connected rotationally fixed to the drive input shaft so that the drive input shaft is coupled to the drive output shaft by way of both planetary gearsets.

Alternatively, or in addition to the above embodiment, in a possible design of the invention, an input shaft and at least functionally a further shifting element as well as an additional shifting element can be provided. In this case the input shaft is provided for coupling to a further drive machine, which is preferably an electric machine. The at least functionally provided further shifting element is either designed, when closed, to connect the input shaft rotationally fixed to the first element of the second planetary gearset, or alternatively the said further shifting element is designed, when closed, to bring the input shaft into rotationally fixed connection with the third element of the first planetary gearset and the second element of the second planetary gearset. In contrast, the at least functionally provided additional shifting element is designed, when closed, to bring the input shaft into rotationally fixed connection with the drive input shaft.

Advantageously, in that way a further drive machine can be connected to the said input shaft and in that case the input shaft is particularly preferably designed for the connection of exactly one further drive machine. In particular the input shaft is also provided with a further connection point where a coupling of the input shaft to the further drive machine can be formed. In that way the connection of the said further drive machine to the said further connection point when the motor vehicle transmission is in its installed condition can in particular be made permanent, this preferably being the case when the further drive machine is in the form of an electric machine. Alternatively, however, in this case as well an intermediate starting element such as a hydrodynamic torque converter, a starting clutch, etc., can be present by way of which the input shaft can be coupled via its connection point to the associated further drive machine. In particular this is done when the said further drive machine is an internal combustion engine.

When the said coupling has been formed and when the motor vehicle transmission has been installed, there is in particular always a fixed rotation speed ratio between the rotation speed of the input shaft of the motor vehicle transmission and the rotation speed of the further drive machine. In the context of the invention, at least one further gear ratio step such as a spur gear stage and/or a planetary gearset can be interposed between the input shaft and the further drive machine, by way of which a pre-geared rotation movement of the further drive machine can be transmitted to the input shaft. Particularly preferably however, when the coupling to the input shaft of the motor vehicle transmission according to the invention is formed, the further drive machine is connected in a rotationally fixed manner so that during operation the further drive machine and the input shaft rotate at the same rotation speed.

If the motor vehicle transmission according to the invention is the transmission of a hybrid or electric vehicle, then the input shaft is provided for coupling to a drive machine in the form of an electric machine. A rotor of the said electric machine can then, as described earlier, be coupled to the input shaft of the motor vehicle transmission by way of at least one intermediate gear ratio step. Particularly preferably however, when the motor vehicle transmission according to the invention has been installed a rotor of the electric machine is connected rotationally fixed to the input shaft so that the rotor of the electric machine is in rotationally fixed connection with the input shaft.

In the above possible embodiment, besides the input shaft the further shifting element and the additional shifting element are also provided, at least functionally. A closed state of the at least functionally provided further shifting element results in a rotationally fixed connection of the input shaft either to the first element of the second planetary gearset or to the third element of the first planetary gearset and the second element of the second planetary gearset, whereby the input shaft and the first element of the second planetary gearset or the input shaft and the third element of the first planetary gearset and the second element of the second planetary gearset rotate together. In contrast, if the at least functionally provided additional shifting element is changed to a closed state, then the drive input shaft and the input shaft are brought into rotationally fixed connection with one another as a result of which the two drive input shafts rotate together.

In a motor vehicle transmission designed in accordance with the aforesaid possible embodiment, the additional shifting element then provides the possibility to make use of the gears that can be engaged between the drive input shaft and the drive output shaft at the same time also for the input shaft, and hence also for the further drive machine coupled thereto. Thus, the first gear, in addition to being engaged between the drive input shaft and the drive output shaft, can also be engaged between the input shaft and the drive output shaft, if in addition to the first shifting element the additional shifting element is closed. Thereupon, the drive input shaft and the input shaft, and therefore both of the drive machines, are coupled to the drive output shaft by way of the first planetary gearset. The second gear too, in addition to being engaged between the drive input shaft and the drive output shaft, can also be engaged between the input shaft and the drive output shaft, if in addition to the second shifting element the additional shifting element is also closed, whereupon the drive input shaft and the input shaft are connected rotationally fixed to one another and hence the two drive machines are coupled with one another and accordingly they are also coupled to the drive output shaft by way of both planetary gearsets.

In a motor vehicle transmission designed according to the invention, if the third shifting element is also provided, at least functionally, then besides its engagement between the drive input shaft and the drive output shaft the third gear too can be engaged between the input shaft and the drive output shaft if, in addition to the third shifting element, the said additional shifting element is closed. Since by means of the additional shifting element the drive input shaft and the input shaft are connected rotationally fixed to one another, when the third shifting element is actuated the drive input shaft and the input shaft are again coupled to the drive output shaft by way of both planetary gearsets.

In a motor vehicle transmission according to the invention which, besides the input shaft, is also equipped at least functionally with the further shifting element and the additional shifting element, a third gear can also be engaged by closing the further shifting element and the additional shifting element at the same time. This has the advantage that in that way a third gear can be engaged even without providing a third shifting element, although then in the third gear there is necessarily an additional coupling of the input shaft to the drive output shaft.

In a motor vehicle transmission according to the invention, thanks to the at least functionally provided further shifting element there also the possibility, during the course of a gearshift, of supporting the traction force at the input shaft and thus complementing it by virtue of the further drive machine connected thereto. Thus, in the course of a gearshift from the first gear engaged between the drive input shaft and the drive output shaft to the second gear engaged between the drive input shaft and the drive output shaft, the traction force at the input shaft can be supported since the further shifting element is closed during the gearshift.

Alternatively, but preferably in addition to this, the traction force at the input shaft is supported during a gearshift from the second gear engaged between the drive input shaft and the drive output shaft to the third gear engaged between the drive input shaft and the drive output shaft, for which purpose the further shifting element is closed during the said gearshift.

By a combination of those two variants, the gearshifts can be carried out without interrupting the traction force.

In a further embodiment of the invention, the at least functionally provided first shifting element, in its closed state, directly brings about the fixed condition of the third element of the first planetary gearset and the second element of the second planetary gearset, since when the first shifting element is closed it connects the third element of the first planetary gearset and the second element of the second planetary gearset rotationally fixed to an immobile structural element. In this variant of the invention, therefore, in its closed state the first shifting element ensures the immobilization of the third element of the first planetary gearset and the second element of the second planetary gearset, for which purpose the first shifting element connects the said two elements rotationally fixed to the immobile structural element.

Alternatively, the at least functionally provided first shifting element, in its closed state, brings about the immobilized condition of the third element of the first planetary gearset and the second element of the second planetary gearset indirectly, in that in its closed state the first shifting element connects the first element of the second planetary gearset rotationally fixed to an immobile structural element. In that way, by fixing the first element of the second planetary gearset in its closed state the first shifting element also indirectly ensures the fixing of the second element of the second planetary gearset and the third element of the first planetary gearset since the third element of the second planetary gearset is permanently fixed.

In accordance with an embodiment of the invention, each individual shifting element is designed at least functionally as an interlocking shifting element, such that the individual shifting element is in this case particularly preferably in the form of an unsynchronized claw-type shifting element. Designing the individual shifting element as an interlocking shifting element has the advantage that in an open state of the shifting element concerned, little or no drag loss takes place at the said shifting element. This improves the efficiency of the motor vehicle transmission. Alternatively, however, the individual shifting element can also be designed as an interlocking shifting element in the form of a locking synchronization.

As another alternative, a functional design of the individual shifting element as a frictional shifting element can also be considered, in which case the individual shifting element could be in the form of a disk-type shifting element. Advantageously, the shifting element concerned can be actuated under load. Particularly preferably however, the individual shifting element is functionally designed as an interlocking shifting element. If the drive input shaft and, if present also the input shaft, are designed for connection to an electric machine in each case, then the at least functionally provided shifting elements are designed as unsynchronized shifting elements since gearshifts and the rotation speed synchronizations required for them at the individual shifting element can be carried out actively by regulating the rotation speed of the electric machine concerned.

If in the motor vehicle transmission according to the invention, besides the first shifting element and the second shifting element, a third shifting element is also functionally provided, then in a further development of the above embodiment the second and the third shifting elements are formed by a shifting device whose coupling element can be moved to a first shift position and a second shift position. In the first shift position the coupling element functionally produces an actuated condition of the second shifting element and connects the first element of the second planetary gearset rotationally fixed to the drive output shaft. In the second shift position the functional element functionally produces an actuated condition of the third shifting element and connects the first element of the second planetary gearset rotationally fixed to the drive input shaft.

Reproducing the functions of the second shifting element and the third shifting element by means of a shifting device has the advantage that the respective rotationally fixed connections can be produced in a compact manner and with a small number of structural elements. Furthermore, in that way a common actuator can be used to actuate the second shifting element and the third shifting element, whereby the production costs are reduced. Particularly preferably, the coupling element can be positioned between the first and second shift positions in a neutral position, such that in this neutral position no coupling is brought about by the coupling element, so that both the second and the third shifting elements remain open. Also preferably, the first shifting element is then in the form of an individual shifting element whose closed state can be produced in particular by a coupling element by means of an associated actuator.

As an alternative to the aforesaid variants of the invention, however, the first, second and third shifting elements could also be formed by a single shifting device, whose coupling element can be moved to a first shift position, a second shift position and a third shift position. In that case, in its first shift position the coupling element reproduces an actuated condition of the first shifting element and therefore immobilizes the first element of the second planetary gearset, whereas in the second shift position the coupling element reproduces an actuated condition of the second shifting element and connects the first element of the second planetary gearset rotationally fixed to the drive output shaft. In the third shift position the coupling element reproduces an actuated condition of the third shifting element and thereby brings the first element of the second planetary gearset and the drive input shaft into rotationally fixed connection with one another.

Advantageously, in this way the functions of the first, second, and third shifting elements can be reproduced compactly and with a small number of components. In this, a common actuator can be used, whereby the production cost is reduced. Particularly preferably, the coupling element between the first shift position and the second shifting element and also between the second shift position and the third shift position can in each case have an intermediate neutral position, such that in the individual neutral positions no coupling takes place by the coupling element so that an open condition of the three shifting elements is obtained.

When the first shifting element is in its closed state the first element of the second planetary gearset is connected to an immobile structural element, but the first shifting element and the second shifting element can also be formed by a shifting device whose coupling element can be positioned respectively in a first and in a second shift position. In the first shift position the coupling element functionally reproduces an actuated condition of the first shifting element and connects the first element of the second planetary gearset rotationally fixed to the immobile structural element, whereas in its second shift position the coupling element functionally reproduces an actuated condition of the second shifting element and connects the first element of the second planetary gearset rotationally fixed to the drive output shaft.

The reproduction of the functions of the first shifting element and the second shifting element by a shifting device also has the advantage that thereby the respective rotationally fixed connections can be realized in a compact manner and with a small number of structural elements. Furthermore, in that way a common actuator can be used to actuate the first shifting element and the second shifting element, whereby the production cost is reduced. Particularly preferably, between the first and second shift positions the coupling element can also be moved to an intermediate neutral position, such that in this neutral position no coupling is effected by the coupling element so that both the first shifting element and the second shifting element are in their open state.

If the motor vehicle transmission according to the invention is additionally provided functionally with the further shifting element and the additional shifting element, then the further shifting element and the additional shifting element are preferably formed by a shifting device whose coupling element can be moved to a first shift position and to a second shift position. In its first shift position the coupling element functionally reproduces an actuated state of the further shifting element and connects the input shaft rotationally fixed to the first element of the second planetary gearset, or to the third element of the first planetary gearset and the second element of the second planetary gearset, whereas in its second shift position the coupling element functionally reproduces an actuated state of the additional shifting element and brings the input shaft and the drive input shaft into rotationally fixed connection with one another.

The reproduction of the functions of the further shifting element and the additional shifting element also has the advantage that, in this way, the respective rotationally fixed connections can be realized in a compact manner and with a small number of structural components. Furthermore, in that way a common actuator can be used for actuating the further shifting element and the additional shifting element, whereby the production cost is reduced. Particularly preferably, between the first and second shift positions the coupling element can also be moved to an intermediate neutral position, such that in this neutral position no coupling is effected by the coupling element so that both the further shifting element and the additional shifting element are in their open state.

In an embodiment of the invention, the planetary gearsets are arranged axially at a connection point which serves to couple the drive input shaft to the drive machine, axially in a sequence of the second planetary gearset and then the first planetary gearset. If the motor vehicle transmission according to the invention also has an input shaft for the connection of a further drive machine, then in a further development of the said embodiment a further connection point is provided, which serves for coupling the input shaft to the further drive machine, axially between the said connection point and the second planetary gearset. Advantageously, in that way a suitable structure of the motor vehicle transmission according to the invention can be produced.

In the aforesaid structure, the second shifting element and, if present, the third shifting element can in particular be positioned axially between the second planetary gearset and the first planetary gearset, while the third shifting element, if present, is preferably positioned axially between the second planetary gearset and the second shifting element. Alternatively, however, the second shifting element and, if present, the third shifting element can also be arranged axially between the connection point of the drive input shaft and the second planetary gearset.

If the first shifting element brings about a direct immobilization of the third element of the first planetary gearset and the second element of the second planetary gearset, then the first shifting element is positioned in particular axially on a side of the first planetary gearset facing away from the second planetary gearset. In contrast, in the case that the first element of the second planetary gearset is immobilized by the first shifting element, then the first shifting element is positioned axially between the connection point and the second planetary gearset and in that case, particularly preferably, the second shifting element and, if present, the third shifting element are arranged axially between the connection point and the second planetary gearset. In that case the third shifting element, if present, is axially adjacent to the connection point and is then followed axially by the second shifting element and then the first shifting element.

If the motor vehicle transmission according to the invention also comprises the input shaft and at least functionally the further shifting element and the additional shifting element as well, then the further shifting element and the additional shifting element are preferably arranged axially between the further connection point of the input shaft and the second planetary gearset. In that case, the additional shifting element is positioned in particular axially adjacent to the said further connection point, and it is then followed axially by the further shifting element.

A further possible design of the invention is that the drive output shaft is coupled with a differential gearset. In a further development of this design possibility the drive output shaft is connected rotationally fixed to an input element of the downstream differential gearset, this input element preferably being a differential cage of the differential gearset. Alternatively, however, the drive output shaft can be coupled to the downstream differential gearset by way of one or more intermediate gear ratio steps, which can be in the form of spur gear and/or planetary stages. The differential gearset can be in the form of a conical gear differential, a planetary gear differential, a spur gear differential, or a helical gear differential.

An object of the invention is also a drive unit which comprises, besides an electric machine, also a motor vehicle transmission according to one or more of the variants described above. In this, a rotor of the electric machine is coupled to the drive input shaft of the motor vehicle transmission. In the context of the invention the electric machine can in particular be operated on the one hand as a generator and on the other hand as an electric motor. In that way a drive unit can be provided, which is suitable for use in a motor vehicle in the form of an electric vehicle or a hybrid vehicle.

Particularly preferably, the electric machine is arranged coaxially with the drive input shaft and the rotor of the electric machine is connected rotationally fixed to the drive input shaft. In that case, during operation the drive input shaft and the rotor of the electric machine run at the same rotation speed. Alternatively, however, it is also conceivable that the rotor of the electric machine is coupled to the drive input shaft by way of at least one gear ratio step.

If the drive unit comprises a motor vehicle transmission which, besides the drive input shaft, also comprises the input shaft for connecting a further drive machine, then this drive unit includes a further electric machine whose rotor is coupled to the input shaft of the motor vehicle transmission. In this case, in the context of the invention the said further electric machine can be operated on the one hand as a generator and on the other hand as an electric motor. Alternatively, or in addition, the further electric machine is in particular arranged coaxially with the input shaft and the rotor of the further electric machine is connected rotationally fixed to the input shaft, so that during operation the input shaft and the rotor of the further electric machine run at the same rotation speed. Here again however, it is likewise easily conceivable that the rotor of the further electric machine is coupled with the input shaft by way of at least one gear ratio step.

In a drive unit as described above with two electric machines, the further electric machine connected to the input shaft preferably is less powerful than the electric machine connected to the drive input shaft and serves to support (e.g., boost, support the traction force during gearshift processes, etc.) the electric machine connected to the drive input shaft. Alternatively, however, the two electric machines can have equal or essentially equal power.

A drive unit that corresponds with one or the above two variants is in particular part of a motor vehicle drivetrain, which is this case is provided in particular for use in an electric vehicle or a hybrid vehicle. In that case the drive unit according to the invention can be in the motor vehicle drivetrain specifically as part of a drive axle of the motor vehicle concerned. The drive unit is then preferably arranged in the same plane as drive output shafts in particular associated in each case with at least one drive wheel and coupled to the drive output shaft of the motor vehicle transmission. Advantageously, in that way a compact structure of a drive axle with the said drive unit can be achieved, the coupling between the drive output shaft of the motor vehicle transmission and the drive output shafts of the drive axle being in particular effected via a differential gearset.

In the context of the invention, a motor vehicle drivetrain as described is provided in a hybrid or electric vehicle, which can be a passenger car or a utility vehicle. A utility vehicle can be in the form of an at least partially electrically powered transporter or a light to middleweight bus or truck.

In the context of the invention, that two structural elements of the motor vehicle transmission in a hybrid or element vehicle are "connected" or "coupled" or are "in connection with one another" means a permanent coupling of the said structural elements, so that they cannot rotate independently of one another. Insofar, between these structural elements, which can be shafts and/or elements of the planetary gearsets and/or a rotationally fixed structural element of the transmission, no shifting element is provided but rather, the corresponding structural elements are coupled with one another with a fixed rotation speed ratio.

In contrast, if a shifting element is provided at least functionally between two structural elements, then these structural elements are not permanently coupled with one another but rather, coupling only takes place when the at least functionally provided intermediate shifting element is actuated. In the context of the invention actuation of the shifting element means that the shifting element concerned is changed to a closed state so that consequently the structural elements directly coupled thereto are constrained to undergo the same rotation movement. In the case when the shifting element concerned is designed as an interlocking shifting element, the structural elements directly connected to one another rotate at the same speed, whereas in the case of a frictional shifting element rotation speed differences can exist between the structural elements. However, in the context of the invention this desired, or even undesired condition of the structural elements concerned is called a rotationally fixed connection thereof by way of the shifting element.

BRIEF DESCRIPTION OF THE DRAWINGS

Advantageous embodiments of the invention, which are explained below, are represented in the drawings, which show:

FIG. 4: A tabulated representation of various functions of the drive units in FIGS. 2 and 3;

FIG. 8: A tabulated representation of various functions of the drive units in FIGS. 5 to 7;

FIG. 10: A tabulated representation of various functions of the drive unit in FIG. 9.

DETAILED DESCRIPTION

Figure 1:
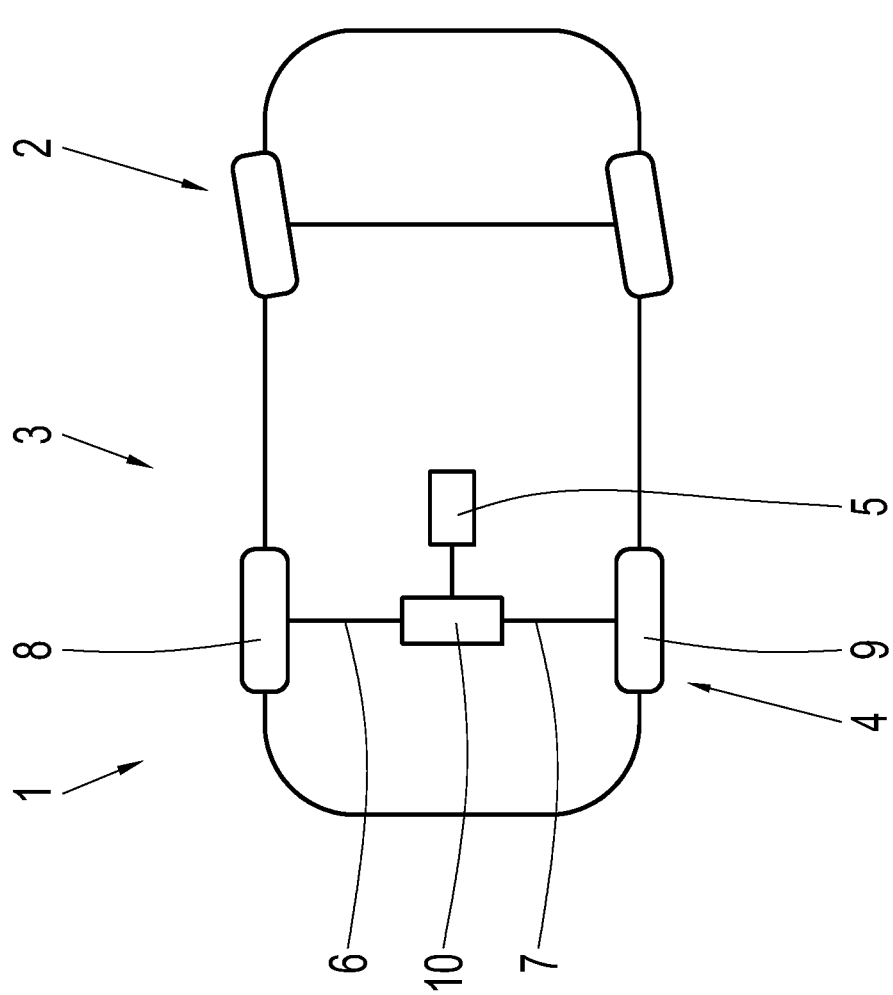
FIG. 1: A schematic representation of an electric vehicle corresponding to a preferred embodiment of the invention.

FIG. 1 shows a schematic view of an electric vehicle 1, which can in particular be a passenger car or even an electric utility vehicle such as a transporter. Besides a steerable, non-driven vehicle axle 2, the electric vehicle 1 has a motor vehicle drivetrain 3 with a drive axle 4, in which drive wheels 8 and 9 can be driven by way of a drive unit 5 by means of drive output shafts 6 and 7. In this case the drive unit 5 is coupled to the drive output shafts 6 and 7 via an intermediate differential gearset 10 wherein, in a manner known in principle to those familiar with the subject, the differential gearset 10 is a transverse differential and distributes a drive power to the two drive output shafts 6 and 7. In this case the differential 10 is in particular in the form of a conical gear differential.

Whereas in this case the vehicle axle 2 is a front axle of the electric vehicle 1, the drive axle 4 is a rear axle of the electric vehicle 1. Alternatively, or in addition to the drive axle 4, however, the vehicle axle 2 could be designed as a driven axle as part of the motor vehicle drivetrain 3.

Figure 2:
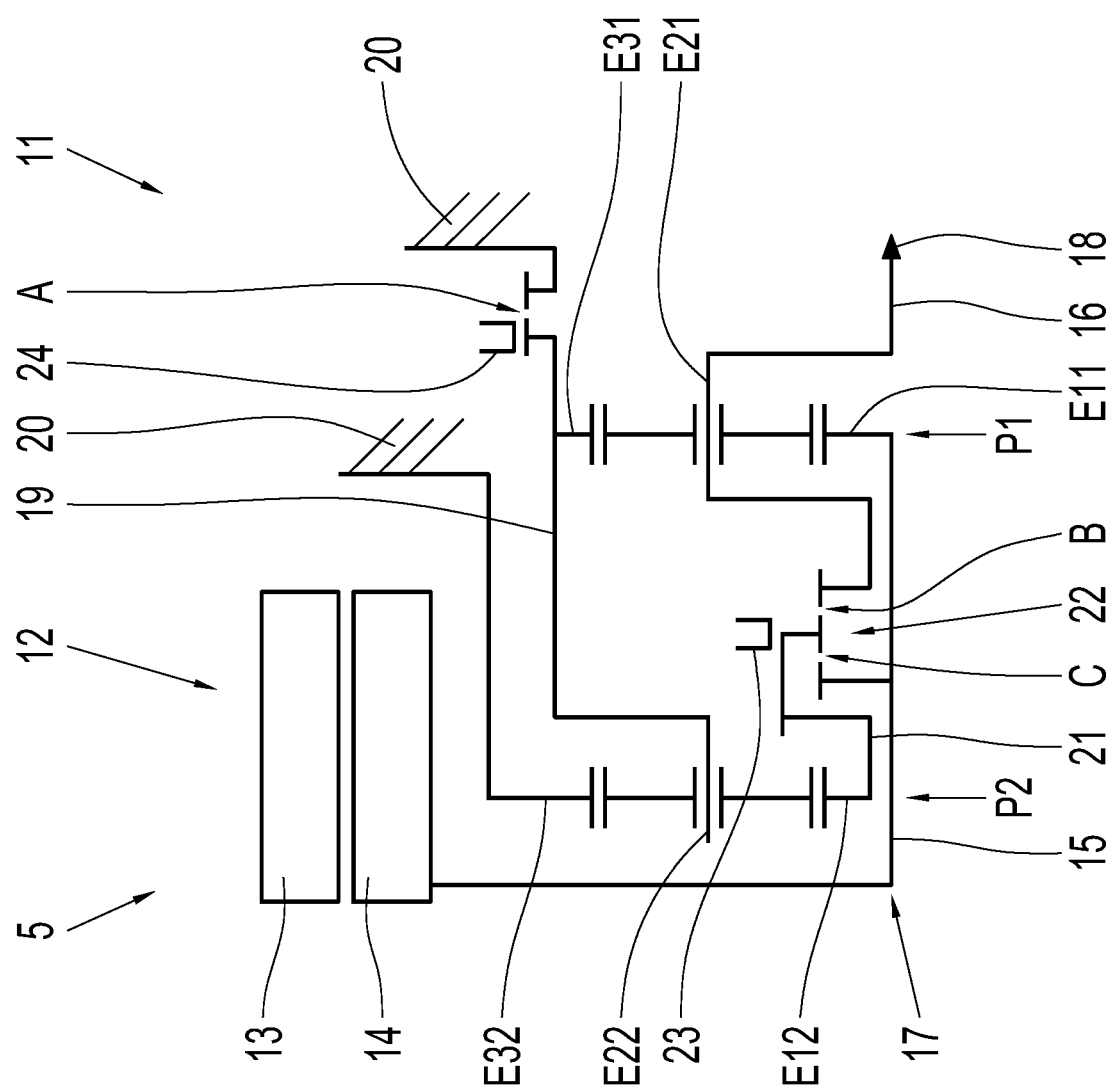
FIG. 2: A schematic view of a drive unit of the electric vehicle in FIG. 1, corresponding to a first embodiment of the invention.

In FIG. 2 the drive unit 5 in FIG. 1 is now shown in greater detail, the drive unit 5 being designed in accordance with a first possible design of the invention. In this case the drive unit 5 consists of a motor vehicle transmission 11 and an electric machine 12, wherein the motor vehicle transmission 11 is designed in accordance with a first embodiment of the invention. In a manner whose principle is known to those familiar with the subject, the electric machine 12 is formed by a stator 13 and a rotor 14 and can be operated on the one hand as a generator and on the other hand as an electric motor.

The motor vehicle transmission 11 comprises a drive input shaft 15, a drive output shaft 16 and two planetary gearsets P1 and P2, each consisting respectively of a first element E11, E12, a second element E21, E22 and a third element E31, E32. The respective first element E11 or E12 of the associated planetary gearset P1 or P2 is a sun gear in each case, whereas the respective second element E21 or E22 of the associated planetary gearset P1 or P2 is a planetary web in each case. In addition, the respective third element E31 or E32 of the associated planetary gearset P1 or P2 is a ring gear in each case.

On the respective planetary web of the associated planetary gearset P1 or P2, in this case at least one planetary gearwheel is mounted to rotate, which planetary gearwheel meshes both with the associated sun gear and with the associated ring gear. Accordingly, the planetary gearsets P1 and P2 are in this case in the form of minus planetary gearsets. In the context of the invention, however, it is conceivable to design one or both planetary gearsets as plus planetary gearsets and for that purpose, compared with the design as minus planetary gearsets the respective second element E21 or E22 is formed by the associated ring gear and the respective third element E31 or E32 is formed by the associated planetary web. Furthermore, when the respective planetary gearsets are in the form of a plus planetary gearset as opposed to a minus planetary gearset, the stationary gear ratio is increased by one. In a plus planetary gearset at least one planetary gearwheel pair is mounted to rotate on the planetary web, of which planetary gearwheels one meshes with the sun gear and one with the ring gear concerned. Moreover, the planetary gearwheels of the at least one pair of planetary gearwheels mesh with one another.

In the present case the first element E11 of the first planetary gearset P1 is connected rotationally fixed to the drive input shaft 15, which is also connected rotationally fixed to the rotor 14 of the electric machine 12 at a connection point 17. Accordingly, the first element E11 of the first planetary gearset P1 and the rotor 14 are also connected rotationally fixed to one another by way of the drive input shaft 15, so that the first element E11 of the first planetary gearset P1 and the rotor 14 always rotate at the same rotation speed. In the context of the invention the drive input shaft 15 can be made integrally, as one piece with the first element E11 of the first planetary gearset P1 and/or with the rotor 14 of the electric machine 12.

The drive output shaft 16 is connected rotationally fixed to the second element E21 of the first planetary gearset P1, and the drive output shaft 16 is also provided with a connection point 18 at which, within the motor vehicle drivetrain 3 in FIG. 1, a coupling is formed to the differential gearset 10. Here, the said coupling is preferably in the form of a rotationally fixed connection of the drive output shaft 16 to a differential cage of the differential gearset 10, although alternatively the drive output shaft 16 can be coupled to the differential gearset 10 by at least one intermediate gear ratio step in the form of a spur gear stage and/or a planetary stage. Furthermore, the differential gearset 10 and the intermediate gear ratio step, if present, can also be part of the motor vehicle transmission 11.

As can be seen in FIG. 2, the third element E31 of the first planetary gearset P1 and the second element E22 of the second planetary gearset P2 are also connected rotationally fixed to one another, the rotationally fixed connection being formed in this case by a shaft 19. The third element E32 of the second planetary gearset P2 is permanently connected rotationally fixed to a permanently immobilized structural element 20, this being a transmission housing of the motor vehicle transmission 11, part of the transmission housing, or a component connected rotationally fixed thereto. In the transmission housing of the motor vehicle transmission 11, besides components of the motor vehicle transmission 11 itself the electric machine 12 too is preferably accommodated. Owing to the permanent rotationally fixed connection of the third element E32 of the second planetary gearset P2 to the fixed structural element 20, the third element E32 of the second planetary gearset P2 is permanently prevented from rotating. Furthermore, the first element E12 of the second planetary gearset P2 is connected rotationally fixed to a shaft 21.

The motor vehicle transmission 11 comprises a number of shifting elements A, B, and C, in each case in the form of interlocking shifting elements, namely unsynchronized claw-type shifting elements. Whereas the shifting element A is provided as a single shifting element, the functions of the shifting elements B and C are reproduced by a shifting device 22. The shifting device 22 has in this case a coupling element 23 which is in the form of a sliding sleeve and by virtue of an associated actuator—not shown here—can move axially, in addition to a neutral position, to two different shift positions. The said actuator is preferably an electro-mechanical actuator. In the first shift position of the coupling element 23 an actuated state of the shifting element B is functionally reproduced, in which state the shaft 21 is connected rotationally fixed to the drive input shaft 16. Correspondingly, in the closed state of the shifting element B the first element E12 of the second planetary gearset P2 is brought into rotationally fixed connection with the second element E21 of the first planetary gearset P1.

In contrast, in the second shift position of the coupling element 23 the actuated state of the shifting element C is reproduced, in which state the shaft 21 is connected rotationally fixed to the drive input shaft 15. In that way the first element E12 of the second planetary gearset P2 and the first element E11 of the first planetary gearset P1 as well as the rotor 14 of the electric machine 12 are connected rotationally fixed to one another and consequently they rotate together.

A coupling element 24 is also associated with the single shifting element A, which element can be changed by means of an actuator—again not shown—to a neutral position or to a shift position in which the coupling element 24 reproduces the closed state of the shifting element A. In this closed state the shaft 19 is connected rotationally fixed to the immobile structural element 20 and therefore also immobilized, which means that the third element E31 of the first planetary gearset P1 and the second element E22 of the second planetary gearset P2 are also immobilized.

As can be seen in FIG. 2, the drive input shaft 15, the drive output shaft 16 and also the two planetary gearsets P1 and P2 are arranged coaxially with one another, and further, besides the shaft 19 and the shaft 21, the electric machine 12 is also positioned coaxially thereto. Axially after the connection point 17 of the drive input shaft 15 there follow first the second planetary gearset P2, then the first planetary gearset P1, and finally the connection point 18 of the drive output shaft 16. The electric machine 12 is axially positioned essentially in a plane with the second planetary gearset P2, which latter is located radially inside the electric machine 12.

The shifting device 22 is arranged axially between the first planetary gearset P1 and the second planetary gearset P2, so that the shifting device 22 overlaps axially with the electric machine 12 and is radially inside it. On the other hand, the shifting element A is located on a side of the first planetary gearset P1 facing away from the second planetary gearset P2, and in particular is positioned axially between the first planetary gearset P1 and the connection point 18 of the drive output shaft 16.

Whereas the drive input shaft 15 is essentially in the form of a solid shaft and extends starting from the connection point 17 radially inside the second planetary gearset P2 as far as the first planetary gearset P1, the two shafts 19 and 21 are hollow shafts. The shaft 19 extends axially, starting from the second planetary gearset P2, beyond the first planetary gearset P1 in order to be able to form a rotationally fixed connection to the fixed structural element 20 by virtue of the shifting element A when the latter is in its closed state. On the other hand, the shaft 21 extends axially only between the second planetary gearset P2 and the shifting device 22. The drive output shaft 16 is in the form of a hollow shaft at least axially between the shifting device 22 and the first planetary gearset P1, but on an axial side of the first planetary gearset P1 facing away from the shifting device 22 it can be in the form of a solid shaft, at least in part.

Figure 3:
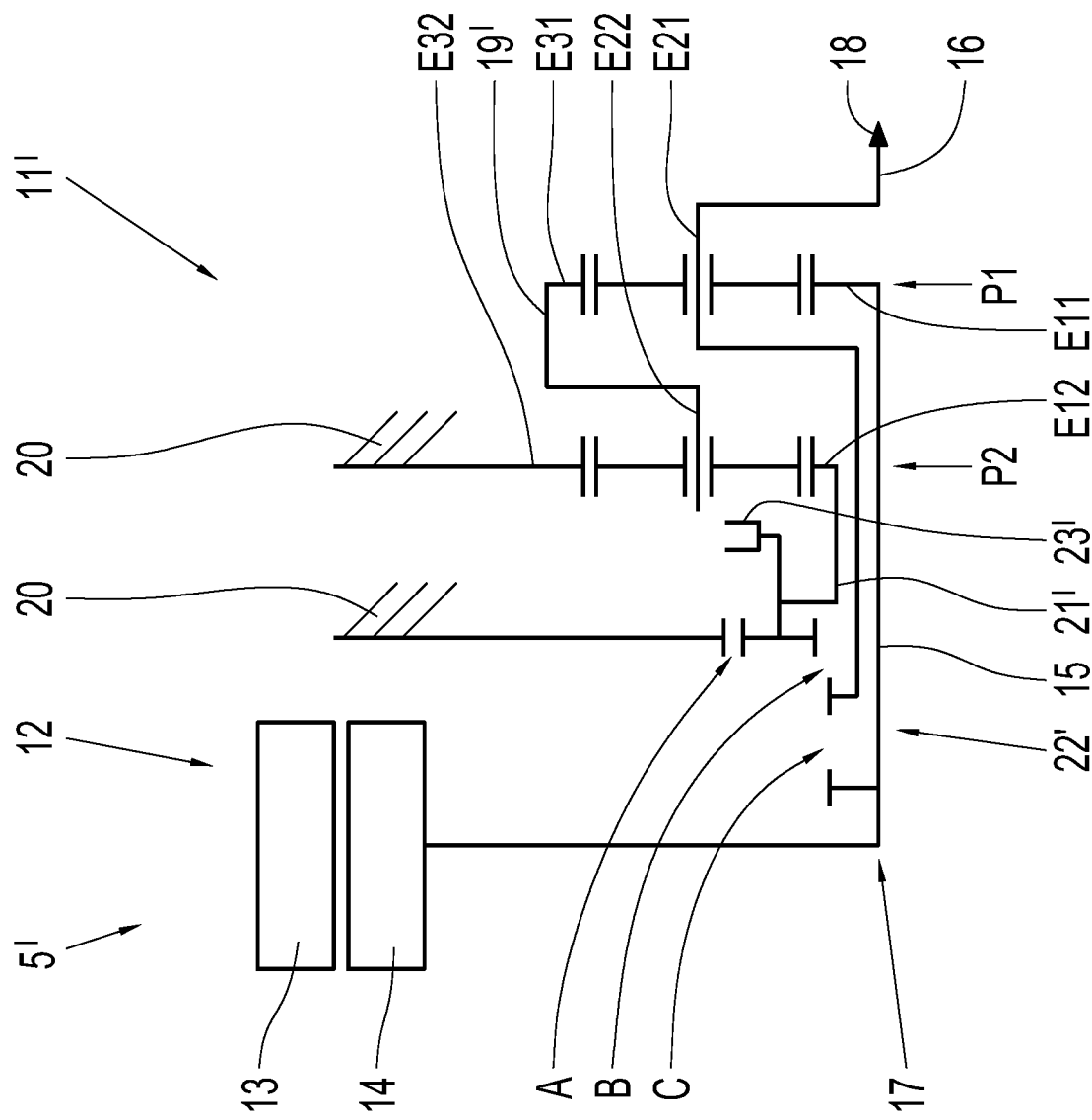
FIG. 3: A schematic representation of a drive unit according to a second possible embodiment of the invention.

FIG. 3 shows a schematic representation of a drive unit 5' that corresponds to a second possible design of the invention, which unit can also be used in the drive axle 4 of the motor vehicle drivetrain 3 in FIG. 1. In this case the drive unit 5' corresponds in essence to the drive unit 5 according to FIG. 2, with the difference that a shifting device 22' of a motor vehicle transmission 11 with this drive unit 5' now reproduces the functions of the shifting elements A, B and C. For this, a coupling element 23' of the said shifting unit 22', besides a shift position that produces the closed state of the shifting element B, can be changed to a first neutral position, to a shift position that produces the closed state of the shifting element C, to a further neutral position, and finally to a shift position that produces the closed state of the shifting element A.

In this shift condition that produces the closed state of the shifting element A, a shaft 21' is fixed on the immobilized structural element 20 so that the shaft 21' is connected rotationally fixed to the first element E12 of the second planetary gearset P2. Consequently, in the closed state of the shifting element A the first element E12 of the planetary gearset P2 is also immobilized, which owing to the permanently fixed condition of the third element E32 of the second planetary gearset P2, indirectly brings about the fixing of the second element E22 of the second planetary gearset P2. The latter is in this case connected rotationally fixed via a shaft 19' to the third element E31 of the first planetary gearset P1, so that the third element E31 of the first planetary gearset P1 is also immobilized when the shifting element A is in its closed state.

In contrast, in the two neutral positions of the shifting device 22' none of shifting elements A, B, and C is in a closed state. The shifting device 22' in this case is located axially between the connection point 17 of the drive input shaft 15 and the second planetary gearset P2, whereas the latter in this case is no longer axially at the level of the electric machine 12. The shifting device 22' as well is axially only partially at the level of the electric machine 12. In other respects, the drive unit 5' in FIG. 3 corresponds to the drive unit 5 in FIG. 2, so that reference can be made to the description of the latter.

Figure 4:
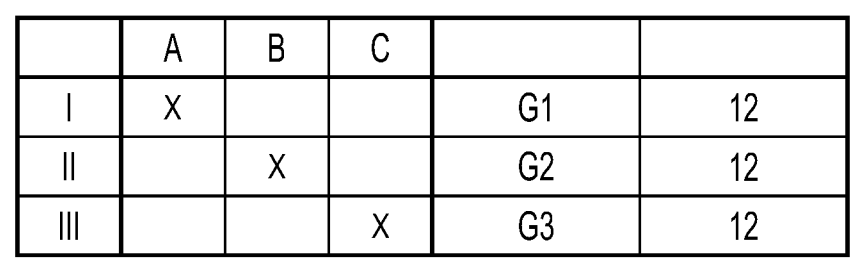

Furthermore, FIG. 4 shows in tabular form an oversight of various functions I to III that can in each case be obtained by means of the drive units 5 and 5' in FIGS. 2 and 3 respectively. Thus, with function I a first gear G1 is engaged, for which purpose the shifting element A is closed and correspondingly the shaft 19 or 19' is immobilized directly or indirectly. Owing to the fixed condition of the third element E31 of the first planetary gearset P1, the drive input shaft 15 and so too the rotor 14 of the electric machine 12 is coupled via the first planetary gearset P1 to the drive output shaft 16, whereas the second planetary gearset P2 is free from load. In that way good efficiency is achieved in the first gear G1.

In contrast, with function II a second gear G2 is engaged in that the shifting element B is closed and correspondingly the shaft 21 or 21' is connected rotationally fixed to the drive output shaft 16. In that way the drive input shaft 15 and hence also the rotor 14 of the electric machine 12 are coupled to the drive output shaft 16 by way of both planetary gearsets P1 and P2. Moreover, in a third gear G3 corresponding to function III, the drive input shaft 15 is coupled to the drive output shaft 16 and consequently the electric machine 12 is connected via both planetary gearsets P1 and P2 along a different power flow path, for which purpose the shifting element C is closed.

A change between the functions I to III and thus also between the gears G1 to G3 takes place in each case by active rotation speed regulation of the electric machine 12, in each case in order to synchronize the rotation speed required for the respective shifting element A or B or C to be disengaged, followed by synchronizing the rotation speed required for the respective shifting element A or B or C to be closed.

Figure 5:
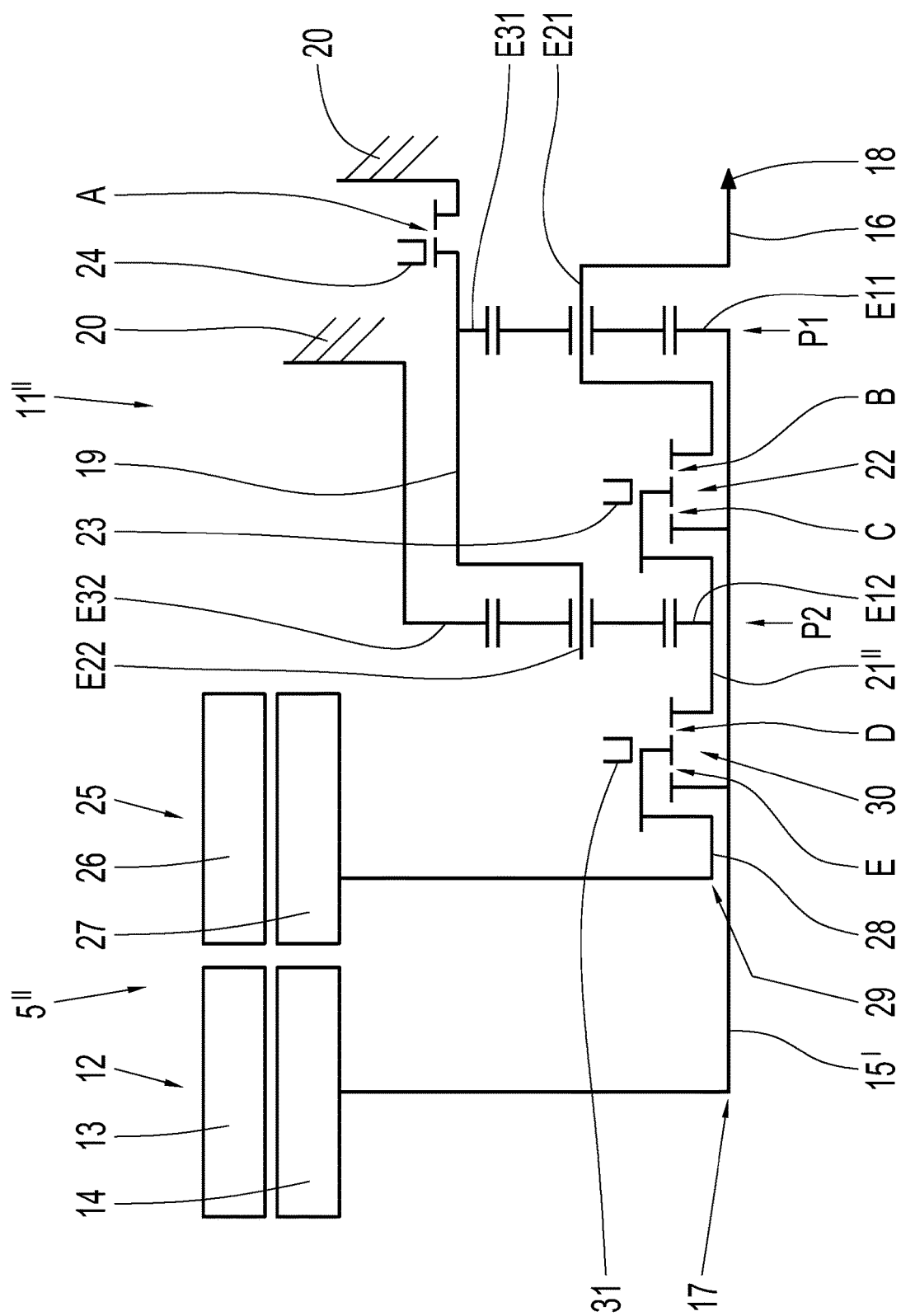
FIG. 5: A schematic view of a drive unit corresponding to a third embodiment of the invention.

Furthermore, FIG. 5 shows a schematic representation of a drive unit 5'', which is designed in accordance with a third embodiment of the invention, and which can be used as an alternative to the drive unit 5 in FIG. 2 in the motor vehicle drivetrain 3 shown in FIG. 1. In this case the drive unit 5'' corresponds in essence to the drive unit 5 in FIG. 2, with the difference being that besides the electric machine 12, a further electric machine 25 is now provided, which consists of a stator 26 and a rotor 27 and which can be operated on the one hand as a generator and on the other hand as an electric motor. The electric machine 25 is preferably less powerful than the electric machine 12. In addition, the electric machine 25 is arranged coaxially with the electric machine 12 and also comprises a drive input shaft 15' and the drive output shaft 16 of a motor vehicle transmission 11'' of the drive unit 5''.

The rotor 27 is connected rotationally fixed to an input shaft 28 of the motor vehicle transmission 11'' and the said input shaft 28, which is a hollow shaft, is arranged coaxially with the drive input shaft 15', the two planetary gearsets P1 and P2 and also the drive output shaft 16. The rotationally fixed connection of the input shaft 28 to the rotor 27 is formed at a connection point 29 of the input shaft 28. The connection point 29 is provided axially between the connection point 17 of the drive input shaft 15' and the second planetary gearset P2, so that as a further difference from the variant according to FIG. 2, the electric machine 12 is now no longer at the level of the planetary gearset P2 but axially farther away in order to be able to arrange the electric machine 25 in-between them. For the rotationally fixed connection to the rotor 14 of the electric machine 12, the drive input shaft 15' is correspondingly made axially longer.

As a further difference, the motor vehicle transmission 11'' has a further shifting device 30 by which the function of two further unsynchronized shifting elements D and E are reproduced. Associated with the shifting device 30 is a coupling element 31, which is in the form of a sliding sleeve and by means of an actuator—no more of which is shown—can be moved, in addition to a neutral position, also to two shift positions. In the first shift position a closed state of the shifting element D is produced, in which the coupling element 31 connects the input shaft 28 and thus also the rotor 27 of the electric machine 25 rotationally fixed to a shaft 21''' which, analogously to the variant in FIG. 2, is connected rotationally fixed to the first element E12 of the second planetary gearset P2 and can be coupled by means of the shifting device 22.

On the other hand, in the other shift position of the coupling element 31 the shifting device 30 produces a closed state of the shifting element E in which the input shaft 28 is connected rotationally fixed to the drive input shaft 15'. In that way the two rotors 14 and 27 of the electric machines 12 and 25 are connected rotationally fixed to one another.

The shifting device 30 is arranged axially between the connection point 29 of the input shaft 28 and the second planetary gearset P2, so that in this case the shifting device 30 is arranged axially overlapping the electric machine 25 and radially inside the latter. In other respects, the embodiment according to FIG. 5 corresponds to the variant in FIG. 2, so that reference can be made to the description of the latter.

Figure 6:
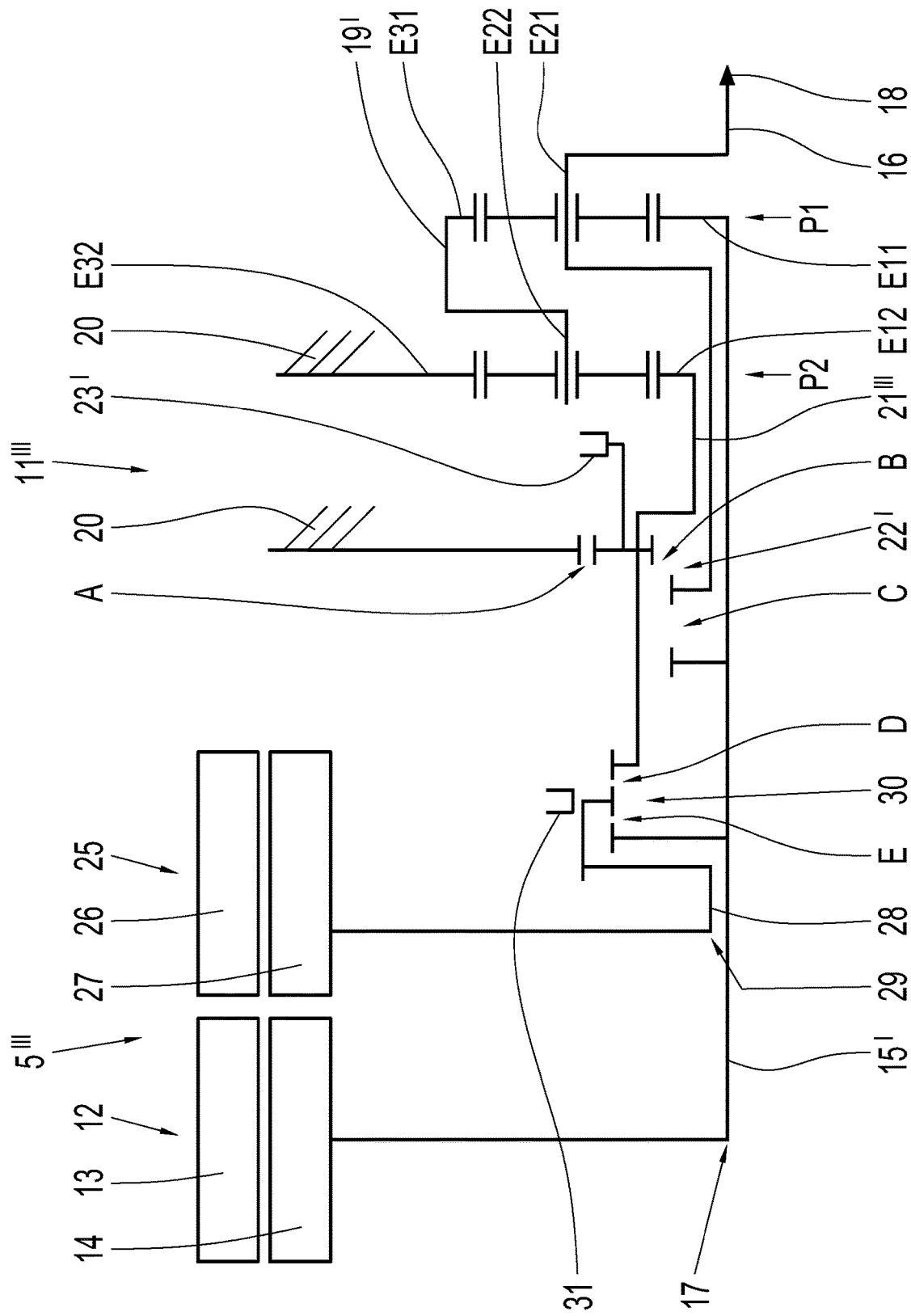
FIG. 6: A schematic representation of a drive unit according to a fourth possible embodiment of the invention.

FIG. 6 shows a schematic representation of a drive unit 5''' according to a fourth possible design of the invention, which can also be used alternatively to the drive unit 5 of FIG. 2 in the motor vehicle drivetrain 3 in FIG. 1. In this case the drive unit $5'''$ corresponds essentially to the previous variant in FIG. 5, but here the drive unit $5'''$ differs from the drive unit $5''$ in FIG. 5 in that in a motor vehicle transmission $11'''$ of the drive unit $5'''$, analogously to the variant in FIG. 3, in a closed state of the shifting element A, a shaft $21'''$ is fixed on the immobile structural element 20. In this case the shaft $21'''$ is connected rotationally fixed to the first element E12 of the second planetary gearset P2. Likewise, analogously to the variant in FIG. 3, the shifting element A together with the shifting elements B and C are formed by a shifting device $22'$.

As already discussed in the variant according to FIG. 5, when the coupling element 31 of the shifting device 30 produces the closed state of the shifting element D, the shaft $21'''$ is connected rotationally fixed to the input shaft 28. The shifting element $22'$ is arranged axially between the shifting device 30 and the second planetary gearset P2. Furthermore, a shaft $19'$ of the motor vehicle transmission $11'''$ can now not be fixed, but only connects the second element E22 of the second planetary gearset P2 and the third element E31 of the first element of the first planetary gearset P1 to one another in a rotationally fixed manner. In other respects, the possible design according to FIG. 6 corresponds to the variant according to FIG. 5, so that reference can be made to the description of the latter.

Figure 7:
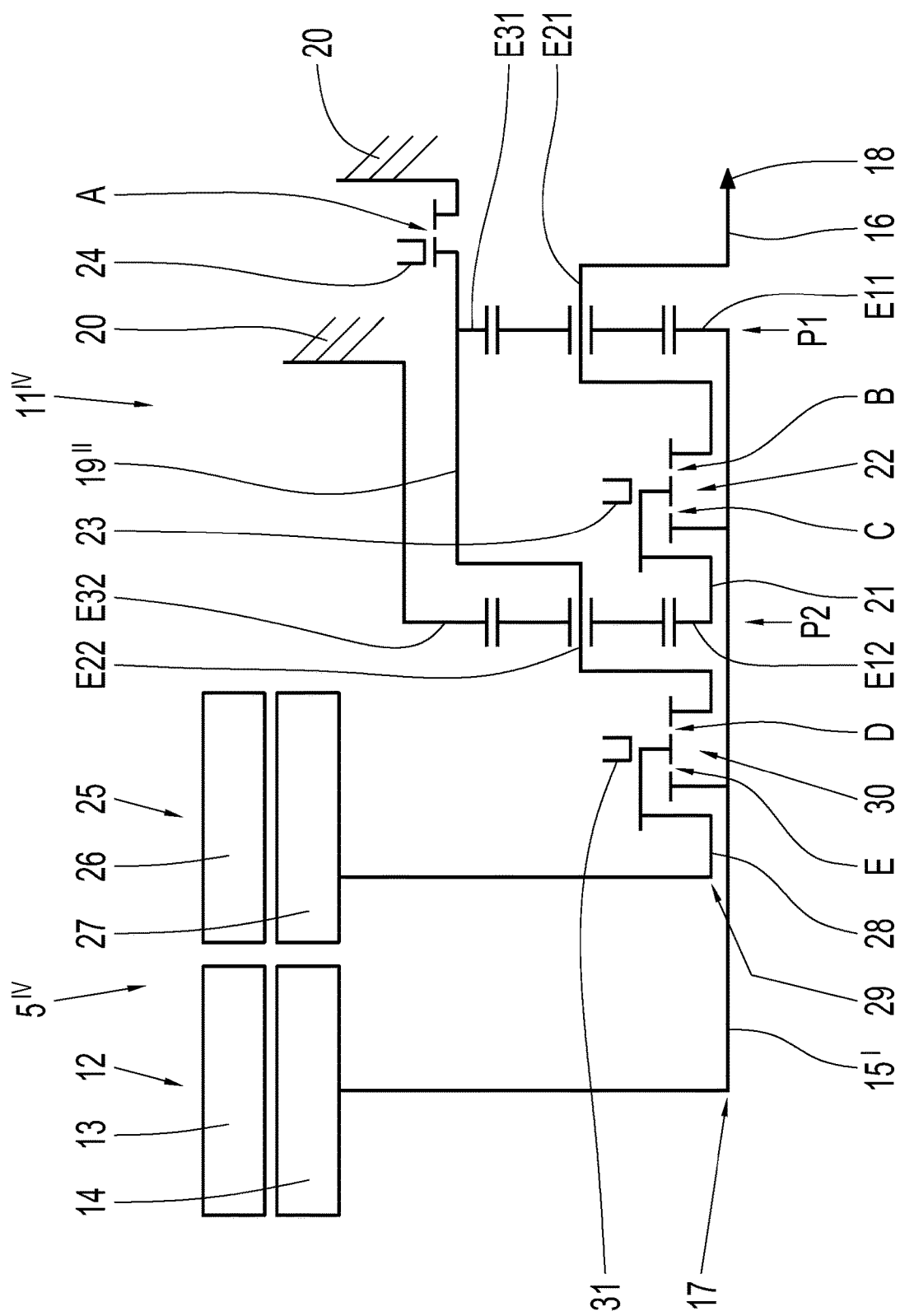
FIG. 7: A schematic view of a drive unit corresponding to a fifth embodiment of the invention.

Furthermore, FIG. 7 shows a schematic view of a drive unit $5^{IV}$ which is designed in accordance with a fifth embodiment of the invention. The drive unit $5^{IV}$ can be used as an alternative to the drive unit in FIG. 2 in the motor vehicle drivetrain 3, and very largely corresponds to the drive unit $5''$ in FIG. 5. Other than in the variant according to FIG. 5, however, the coupling element 31 of the shifting device 30 of a motor vehicle transmission $11^{IV}$ of the drive unit $5^{IV}$, when it produces the closed state of the shifting element D, now connects the input shaft 28 rotationally fixed to a shaft $19''$ which connects the second element E22 of the second planetary gearset P2 and the third element E31 of the first planetary gearset P1 rotationally fixed to one another, and by way of the shifting element A, to the permanently fixed structural element 20. For that purpose, compared with the variant according to FIG. 5, the shaft $19''$ is extended as far as the area of the shifting device 30. The shaft 21 of the motor vehicle transmission $11^{IV}$ is connected rotationally fixed to the first element E12 of the second planetary gearset P2 and can now only still be coupled by the shifting device 22. In other respects, the embodiment according to FIG. 7 corresponds to the variant according to FIG. 5, so that reference can be made to the description of the latter.

FIG. 8 shows a tabulated oversight of various functions I' to VI', which can be realized by means of the drive units $5''$ to $5^{IV}$ in FIGS. 5 to 7. In this case the function I' corresponds to the function I according to FIG. 4, the function III' to the function II according to FIG. 4, and the function V' to the function III according to FIG. 4, in that the electric machine 12, in the case of the function I', is connected by engaging the first gear G1, in the case of function III' by engaging the second gear G2, and in the case of the function V' by engaging the third gear G3. Accordingly, reference can be made to the description relating to FIG. 4 for those cases.

However, with the drive units $5''$ to $5^{IV}$ in FIGS. 5 to 7, in each of the gears G1 to G3 the electric machine 25 can additionally be connected. Thus, within the scope of Function II' the first gear G1 can also be engaged between the input shaft 28 and the drive output shaft 16, since besides producing a closed state of the shifting element A the shifting element E too is closed. Since when the shifting element E is closed the input shaft 28 is connected rotationally fixed to the drive input shaft $15'$, in this case both of the electric machines 12 and 25 are coupled to the drive input shaft 16 in the first gear G1.

Likewise, the electric machine 25 can also be engaged in the second gear G2 within the scope of function IV', in that besides the shifting element B, a closed state of the shifting element E, and therefore a rotationally fixed connection of the input shaft 28 to the drive input shaft $15'$, is again obtained. In the third gear G3, the electric machine 25 is connected in addition to the electric machine 12, for which purpose, besides a closed state of the shifting element C, the shifting element E is also in its closed state so that the input shaft 28 and the drive input shaft $15'$ are brought into rotationally fixed connection with one another.

Furthermore, with the drive units $5''$ to $5^{IV}$ in FIGS. 5 to 7 the possibility also exists, when changing from function I' to function III' and thus from the first gear G1 to the second gear G2, and also when changing from function III' to function VI' and thus from the second gear G2 to the third gear G3, in each case, to support the traction force by means of the electric machine 25. For this, in the gearshift concerned, the shifting element D must be closed, whereby the electric machine 25 can indirectly support the torque at the third element E31 of the first planetary gearset P1 by way of the second planetary gearset P2, while the electric machine 12 drives the first element E11 of the first planetary gearset P1. In that way a rotation speed overlap occurs at the first planetary gearset P1 while at the same time a desired drive torque is provided at the drive output shaft 16. This makes it possible to relieve each of the shifting elements A, B, and also C from load and therefore to open or close them appropriately for the gearshift concerned.

Figure 9:
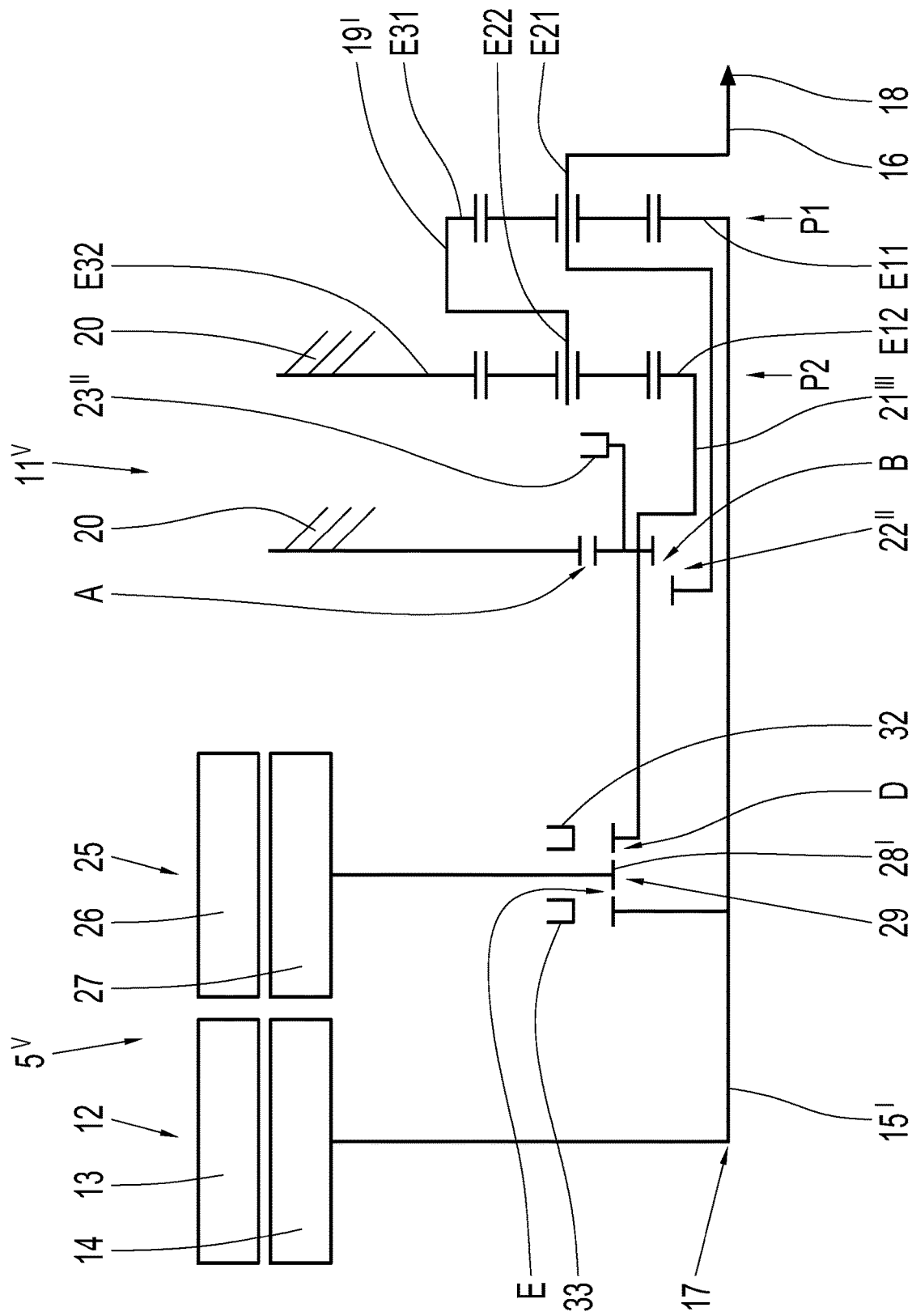
FIG. 9: A schematic representation of a drive unit according to a sixth possible embodiment of the invention.

Finally, FIG. 9 shows a schematic representation of a drive unit $5^V$ according to a sixth design option of the invention, which corresponds in essence to the drive unit $5'''$ in FIG. 6. This drive unit $5^V$ also can also be used as an alternative to the drive unit 5 in FIG. 2 in the motor vehicle drivetrain 3 of FIG. 1. Other than in the drive unit $5'''$ of FIG. 6, in a motor vehicle transmission $11^V$ of the drive unit $5^V$, no shifting element C is now provided, so that also no indirect rotationally fixed connection of the shaft $21'''$ to the drive input shaft $15'$ can be formed. Thus, with a shifting device $22''$ the coupling element $23''$ can only produce a closed state of the shifting element A and the shifting element B.

The shaft $21'''$ and thus also the first element E12 of the second planetary gearset P2 can be connected indirectly to the drive input shaft $15'$ if a closed state of the shifting element D and a closed state of the shifting element E are produced. For this, the shifting element D and the shifting element E are made as single shifting elements with each of which a respective coupling element 32 or 33 is associated. When changed from a neutral position the coupling element 32 connects the shaft $21'''$ rotationally fixed to an input shaft $28'$, which is connected rotationally fixed to the rotor 27 of the electric machine 25 and, other than in the variant according to FIG. 6, is realized as an axially short-length hollow shaft. This input shaft $28'$ can also be connected rotationally fixed to the drive input shaft $15'$ by means of the coupling element 33 when the latter is in its shift position.

The two shifting elements E and D are in the form of unsynchronized claw-type shifting elements and are positioned axially on either side of the connection point 29 at which, radially, the rotationally fixed connection of the input shaft $28'$ to the rotor 27 of the electric machine 25 is formed. In other respects, the design option according to FIG. 9 corresponds to the variant according to FIG. 6, so that reference can be made to the description relating to the latter.

Finally, FIG. 10 again shows various functions I" to V" in tabulated form, each of which can be realized by means of the drive unit $5^V$ in FIG. 9. The functions I" to IV" correspond to the functions I' to IV' according to FIG. 8, so that reference can be made to the description relating to the latter. Other than what is described in relation to FIG. 8, a third gear G3 can now be engaged at the same time both between the drive input shaft 15' and the drive output shaft 16 and also between the input shaft 28' and the drive output shaft 16, when both the shifting element D and the shifting element E are closed. Correspondingly, in the said third gear G3 both of the two electric machines 12 and 25 are now always connected.

Again, when changing from function I" to function III", i.e., from the first gear G1 to the second gear G2, the traction force can be supported by means of the electric machine 25 by closing the shifting element D, this taking place analogously to what was described in connection with FIG. 8. Furthermore, in the case of the drive unit $5^V$ in FIG. 9 this is also possible with a change from the second gear G2 to the third gear G3, within the scope of a change from function III" to function V".

By virtue of the designs of a motor vehicle transmission according to the invention, a suitable integration of at least one drive machine can be realized, such that in one gear a high efficiency is achieved.

INDEXES

1 Electric vehicle
2 Vehicle axle
3 Motor vehicle drivetrain
4 Drive axle
5, 5', 5", 5''', $5^{IV}$, $5^V$ Drive unit
6 Drive output shaft
7 Drive output shaft
8 Drive wheel
9 Drive wheel
10 Differential gearset
11, 11', 11", 11''', $11^{IV}$, $11^V$ Motor vehicle transmission
12 Electric machine
13 Stator
14 Rotor
15, 15' Drive input shaft
16 Drive output shaft
17 Connection point
18 Connection point
19, 19', 19" Shaft
20 Fixed structural element
21, 21', 21", 21''' Shaft
22, 22', 22" Shifting device
23, 23', 23" Coupling element
24 Coupling element
25 Electric machine
26 Stator
27 Rotor
28, 28' Input shaft
29 Connection point
30 Shifting device
31 Coupling element
32 Coupling element
33 Coupling element
P1 First planetary gearset
P2 Second planetary gearset
E11 First element of the first planetary gearset
E21 Second element of the first planetary gearset
E31 Third element of the first planetary gearset
E12 First element of the second planetary gearset
E22 Second element of the second planetary gearset
E32 Third element of the second planetary gearset
A Shifting element
B Shifting element
C Shifting element
D Shifting element
E Shifting element
G1 Gear
G2 Gear
G3 Gear
I to III Functions
I' to VI' Functions
II" to V" Functions

The invention claimed is:

1. A motor vehicle transmission for an at least partially electrically driven motor vehicle, the motor vehicle transmission comprising:
    a first planetary gearset and a second planetary gearset each comprising a first element, a second element, and a third element, in the form respectively, of a sun gear, a planetary web, and a ring gear, wherein the third element of the first planetary gearset is connected rotationally fixed to the second element of the second planetary gearset, and wherein the third element of the second planetary gearset is immobilized;
    a first shifting element or functional equivalent thereof configured in a closed state to immobilize the third element of the first planetary gearset and the second element of the second planetary gearset;
    a second shifting element or functional equivalent thereof configured in a closed state to connect the first element of the second planetary gearset rotationally fixed to a drive output shaft;
    a drive input shaft connected in a rotationally fixed manner to the first element of the first planetary gearset, wherein the drive input shaft is configured for coupling to an electric machine; and
    the drive output shaft connected in a rotationally fixed manner to the second element of the first planetary gearset.

2. The motor vehicle transmission according to claim 1, further comprising:
    a third shifting element or functional equivalent thereof configured in a closed state to bring the first element of the second planetary gearset into a rotationally fixed connection with the drive input shaft.

3. The motor vehicle transmission according to claim 1, further comprising:
    an additional input shaft configured for coupling to a further drive machine, preferably an electric machine, and
    a further shifting element or functional equivalent thereof configured in a closed state to connect the additional input shaft in a rotationally fixed manner to the first element of the second planetary gearset, or to connect the additional input shaft in a rotationally fixed manner to the third element of the first planetary gearset and the second element of the second planetary gearset, the additional shifting element further configured in the closed state, to bring the input shaft in a rotationally fixed connection with the drive input shaft.

4. The motor vehicle transmission according to claim 1, wherein the first shifting element is configured in the closed state to directly bring about the fixed condition of the third element of the first planetary gearset and the second element of the second planetary gearset, and wherein in the closed state the first shifting element connects the third element of the first planetary gearset and the second element of the second planetary gearset to an immobilized structural element.

5. The motor vehicle transmission according to claim 1, wherein the first shifting element, in the closed state, indirectly brings about the fixed condition of the third element of the first planetary gearset and the second element of the second planetary gearset, in that in the closed state the first shifting element connects the first element of the second planetary gearset rotationally fixed to an immobilized structural element.

6. The motor vehicle transmission according to claim 1, wherein individual shifting elements are each in the form, at least functionally, of an interlocking shifting element.

7. The motor vehicle transmission according to claim 1, wherein the second shifting element and the third shifting element are formed by a shifting device, the shifting device having a coupling element configured be moved to a first shift position and to a second shift position, such that in the first shift position the coupling element functionally reproduces an actuated condition of the second shifting element and connects the first element of the second planetary gearset rotationally fixed to the drive output shaft, and such that in the second shift position the coupling element functionally reproduces an actuated condition of the third shifting element and brings the first element of the second planetary gearset and the drive input shaft into rotationally fixed connection with one another.

8. The motor vehicle transmission according to claim 1, wherein the first shifting element, the second shifting element, and the third shifting element are formed by a shifting device, whose coupling element is configured to be positioned respectively in a first shift position, a second shift position, and a third shift position, such that in the first shift position the coupling element functionally reproduces an actuated condition of the first shifting element and immobilizes the first element of the second planetary gearset, wherein in the second shift position the coupling element functionally reproduces an actuated condition of the second shifting element and connects the first element of the second planetary gearset rotationally fixed to the drive output shaft, and wherein in the third shift position the coupling element functionally reproduces an actuated condition of the third shifting element and brings the first element of the second planetary gearset into rotationally fixed connection with the drive input shaft.

9. The motor vehicle transmission according to claim 5, wherein each of the first shifting element and the second shifting element is formed by a shifting device, having a coupling element configured to be moved to a first shift position and to a second shift position, such that in the first shift position the coupling element functionally reproduces an actuated condition of the first shifting element and connects the first element of the second planetary gearset rotationally fixed to the fixed structural element, wherein in the second shift position the coupling element functionally reproduces an actuated condition of the second shifting element and connects the first element of the second planetary gearset rotationally fixed to the drive output shaft.

10. The motor vehicle transmission according to claim 3, wherein the further shifting element and the additional shifting element are formed by a shifting device having a coupling element configured to be moved to a first shift position and to a second shift position, such that in the first shift position the coupling element functionally reproduces an actuated condition of the further shifting element and connects the input shaft rotationally fixed either to the first element of the second planetary gearset or to the third element of the first planetary gearset and the second element of the second planetary gearset, and such that in the second shift position the coupling element functionally reproduces an actuated condition of the additional shifting element and brings the input shaft into rotationally fixed connection with the drive input shaft.

11. The motor vehicle transmission according to claim 1, wherein the planetary gearsets are arranged axially at a connection point configured to couple the drive input shaft to the drive machine, axially in a sequence of the second planetary gearset followed by the first planetary gearset.

12. The motor vehicle transmission according to claim 5, further comprising a further connection point configured to couple the input shaft to the further drive machine, the further connection point between the connection point and the second planetary gearset.

13. The motor vehicle transmission according to claim 1, wherein the drive output shaft is coupled to a differential gearset.

14. A drive unit for an at least partially electrically driven motor vehicle, comprising:
   an electric machine having a rotor;
   a motor vehicle transmission according to claim 1; and
   wherein the rotor of the electric machine is coupled to the drive input shaft of the motor vehicle transmission.

15. The drive unit according to claim 14, further comprising:
   an additional input shaft configured for coupling to a further electric machine, and
   a further shifting element or functional equivalent thereof configured in a closed state to connect the additional input shaft in a rotationally fixed manner to the first element of the second planetary gearset, or to connect the additional input shaft in a rotationally fixed manner to the third element of the first planetary gearset and the second element of the second planetary gearset, the additional shifting element further configured in the closed state, to bring the input shaft in a rotationally fixed connection with the drive input shaft; and
   the further electric machine having a rotor coupled to the additional input shaft of the motor vehicle transmission.

16. A motor vehicle drivetrain for a hybrid or electric vehicle, comprising a drive unit according to claim 14.

17. A hybrid or electric vehicle comprising the motor vehicle drivetrain according to claim 16.

18. A method for operating a motor vehicle transmission according to claim 1, comprising:
   engaging a first gear between the drive input shaft and the drive output shaft when the first shifting element is closed; and
   engaging a second gear between the drive input shaft and the drive output shaft when the second shifting element is closed.

19. The method according to claim 18 and for operating a motor vehicle transmission wherein the motor vehicle transmission further comprises a third shifting element or functional equivalent thereof configured in a closed state to bring the first element of the second planetary gearset into a rotationally fixed connection with the drive input shaft; wherein the method further comprises engaging a third gear between the drive input shaft and the drive output shaft when the third shifting element is closed.

20. The method according to claim 18, wherein the motor vehicle transmission further comprises:
- an additional input shaft configured for coupling to a further drive machine, preferably an electric machine, and
- a further shifting element or functional equivalent thereof configured in a closed state to connect the additional input shaft in a rotationally fixed manner to the first element of the second planetary gearset, or to connect the additional input shaft in a rotationally fixed manner to the third element of the first planetary gearset and the second element of the second planetary gearset, the additional shifting element further configured in the closed state, to bring the input shaft in a rotationally fixed connection with the drive input shaft;

wherein the method further comprises:
- engaging the first gear between the input shaft and the drive output shaft when, in addition to the first shifting element, the additional shifting element is closed; and
- engaging the second gear between the input shaft and the drive output shaft when, in addition to the second shifting element, the additional shifting element is also closed.

21. The method according to claim 20, further comprising:
- engaging the third gear between the input shaft and the drive output shaft when, in addition to the third shifting element, the additional shifting element is also closed.

22. The method according to claim 20, further comprising engaging a third gear between the drive input shaft and the drive output shaft when the further shifting element and the additional shifting element are closed at the same time.

23. The method according claim 20, wherein during the course of a gearshift from the first gear acting between the drive input shaft and the drive output shaft to the second gear acting between the drive input shaft and the drive output shaft, and/or during the course of a gearshift from the second gear acting between the drive input shaft and the drive output shaft to the third gear acting between the drive input shaft and the drive output shaft, in each case a traction force at the input shaft is supported by closing the further shifting element during the gearshift concerned.

* * * * *